US010523031B2

(12) United States Patent
Blair et al.

(10) Patent No.: US 10,523,031 B2
(45) Date of Patent: Dec. 31, 2019

(54) METHOD AND DEVICE FOR CONTROLLING TWO-WIRE DISCHARGE CIRCUIT OF BATTERY

(71) Applicant: Vertiv Corporation, Columbus, OH (US)

(72) Inventors: Charles Frederick Blair, Guangdong (CN); Yang Bing, Guangdong (CN); Junfeng Fu, Guangdong (CN); Yunqing Song, Guangdong (CN); Guoshun Yang, Guangdong (CN)

(73) Assignee: Vertiv Corporation, Columbus, OH (US)

( * ) Notice: Subject to any disclaimer, the term of this patent is extended or adjusted under 35 U.S.C. 154(b) by 47 days.

(21) Appl. No.: 15/563,488

(22) PCT Filed: Mar. 31, 2016

(86) PCT No.: PCT/CN2016/078153
§ 371 (c)(1),
(2) Date: Sep. 29, 2017

(87) PCT Pub. No.: WO2016/155651
PCT Pub. Date: Oct. 6, 2016

(65) Prior Publication Data
US 2018/0090965 A1  Mar. 29, 2018

(30) Foreign Application Priority Data
Mar. 31, 2015 (CN) .......................... 2015 1 0149737

(51) Int. Cl.
*H02J 7/00* (2006.01)
*H02M 3/158* (2006.01)
*H02M 1/15* (2006.01)

(52) U.S. Cl.
CPC ............. *H02J 7/0072* (2013.01); *H02M 1/15* (2013.01); *H02M 3/158* (2013.01)

(58) Field of Classification Search
USPC .......................................................... 320/129
See application file for complete search history.

(56) References Cited

U.S. PATENT DOCUMENTS 5,798,633 A * 8/1998 Larsen ...................... H02J 3/28
                                                                    307/87
7,705,489 B2    4/2010 Nielsen et al.
(Continued)

FOREIGN PATENT DOCUMENTS

CN    1409471 A    4/2003
CN    1578078 A    2/2005
(Continued)

OTHER PUBLICATIONS

Office Action regarding Chinese Patent Application No. 201510149737.4, dated Jul. 19, 2018. Translation provided by Unitalen Attorneys at Law.
(Continued)

*Primary Examiner* — Samuel Berhanu
(74) *Attorney, Agent, or Firm* — Harness, Dickey & Pierce, P.L.C.

(57) ABSTRACT

A method and device for controlling a two-wire discharge circuit of a battery, introducing a whole-bus voltage outer loop and an inductive current average value or inductive current actual value closed loop as a main control loop of the two-wire discharge circuit of the battery so as to guarantee a stable voltage of the whole bus. On the basis of the main control loop, duty ratios of switch transistors in respective discharge branches are adjusted to control the respective discharge branches to independently charge and discharge corresponding half-buses so as to balance the bus voltage. The method and the device avoid accessing a central wire of (Continued)

the battery and any additional circuits, and satisfy a technical specification of a three-wire access of the battery, thereby improving a circuit performance of the two-wire discharge circuit of the battery.

13 Claims, 5 Drawing Sheets

(56) References Cited

U.S. PATENT DOCUMENTS

| | | | |
|---|---|---|---|
| 8,014,181 B2* | 9/2011 | Tan | H02M 7/48 |
| | | | 327/156 |
| 8,929,098 B2* | 1/2015 | Takegami | H02M 3/33584 |
| | | | 320/166 |
| 2005/0017699 A1 | 1/2005 | Stanley | |
| 2008/0157592 A1* | 7/2008 | Bax | H02J 7/022 |
| | | | 307/10.1 |
| 2008/0197796 A1* | 8/2008 | Bae | B60L 15/025 |
| | | | 318/432 |
| 2010/0295374 A1* | 11/2010 | Nielsen | H02J 9/062 |
| | | | 307/66 |
| 2011/0298404 A1* | 12/2011 | Okumatsu | H02P 29/0243 |
| | | | 318/400.21 |

FOREIGN PATENT DOCUMENTS

| | | |
|---|---|---|
| CN | 101685975 A | 3/2010 |
| CN | 103701190 A | 4/2014 |
| CN | 103916008 A | 7/2014 |
| KR | 2000-0031661 A | 6/2000 |

OTHER PUBLICATIONS

Office Action regarding Chinese Patent Application No. 201510149737.4, dated Mar. 5, 2018. Translation provided by Unitalen Attorneys at Law.

International Search Report (in English and Chinese) and Written Opinion of the International Searching Authority (in Chinese) issued in PCT/CN2016/078153, dated Jul. 5, 2016 ISA/CN.

* cited by examiner

US 10,523,031 B2

METHOD AND DEVICE FOR CONTROLLING TWO-WIRE DISCHARGE CIRCUIT OF BATTERY

This application is a National Stage application of PCT international application PCT/CN2016/078153, filed on Mar. 31, 2016 which claims the priority to the Chinese Patent Application No. 201510149737.4, titled "METHOD AND DEVICE FOR CONTROLLING TWO-WIRE DISCHARGE CIRCUIT OF BATTERY" and filed with the Chinese State Intellectual Property Office on Mar. 31, 2015, both of which are incorporated herein by reference in their entirety.

FIELD

The present disclosure relates to the technical field of circuit control, and particularly to a method and a device for controlling a two-wire discharge circuit of a battery.

BACKGROUND

Currently, in order to save cost of a discharge circuit of a battery, a two-wire discharge circuit of the battery in which neutral-wire connection of the battery is not required is proposed in the industry on the basis of a three-wire connection discharge circuit such as the Vienna (Vienna) circuit or the similar-Vienna circuit. As shown in FIG. 1, which is a schematic structural diagram of the two-wire discharge circuit of the battery, the two-wire discharge circuit of the battery may include: a supply power (that is, battery); a positive-bus capacitor C1 and a negative-bus capacitor C2 which are connected to a system neutral point N; three first discharge branches, a terminal of each of the first discharge branches is connected to a positive terminal (Bat+) of the battery, and the other terminal is connected to a system neutral point N; and three second discharge branches, a terminal of each of the second discharge branches is connected to a negative terminal (Bat−) of the battery, and the other terminal is connected to the system neutral point N.

Each of the first discharge branches may include a first thyristor, a first inductor L1, a first switch transistor T1, a first freewheeling diode D1 and a first diode which is connected to the first switch transistor T1 in parallel. In each of the first discharge branches, an anode of the first thyristor is connected to the positive electrode of the battery, a cathode of the first thyristor is connected to a first terminal of the first inductor L1, a second terminal (which is not connected to the first thyristor) of the first inductor L1 is connected to a collector of the first switch transistor T1, an emitter of the first switch transistor T1 is connected to the system neutral point N, an anode of the first freewheeling diode D1 is connected to the second terminal of the first inductor L1, a cathode of the first freewheeling diode D1 is connected to a non-system neutral point of the positive-bus capacitor C1, an anode of the first diode is connected to the emitter of the first switch transistor T1, and a cathode of the first diode is connected to the collector of the first diode T1. It should be further illustrated that, the two-wire discharge circuit of the battery may include three first discharge branches corresponding to three phases A, B and C respectively. Also, for ease of distinguishing, in FIG. 1, the first inductor L1, the first switch transistor T1, the first freewheeling diode D1 and other electronic elements in the first discharge branch corresponding to phase A may be denoted as LA1, TA1, DA1 and the like respectively; the first inductor L1, the first switch transistor T1, the first freewheeling diode D1 and other electronic elements in the first discharge branch corresponding to phase B may be denoted as LB1, TB1, DB1 and the like respectively; and the first inductor L1, the first switch transistor T1, the first freewheeling diode D1 and other electronic elements in the first discharge branch corresponding to phase C may be denoted as LC1, TC1, DC1 and the like respectively, which are not described repeatedly in the present disclosure.

Similarly, each of the second discharge branches may include a second thyristor, a second inductor L2, a second switch transistor T2, a second freewheeling diode D2 and a second diode which is connected to the second switch transistor T2 in parallel. In each of the second discharge branches, a cathode of the second thyristor is connected to the negative electrode of the battery, an anode of the first thyristor is connected to a first terminal of the second inductor L2, a second terminal (which is not connected to the second thyristor) of the second inductor L2 is connected to an emitter of the second switch transistor T2, a collector of the second switch transistor T2 is connected to the system neutral point N, a cathode of the second freewheeling diode D2 is connected to the second terminal of the second inductor L2, and an anode of the second freewheeling diode D2 is connected to a non-system neutral point of the negative-bus capacitor C2, and an anode of the second diode is connected to the emitter of the second switch transistor T2, and a cathode of the second diode is connected to the collector of the second switch transistor T2. It should be illustrated that, the two-wire discharge circuit of the battery may include three second discharge branches corresponding to three phases A, B and C. Also, for ease of distinguishing, in FIG. 1, the second inductor L2, the second switch transistor T2, the second freewheeling diode D2 and other electronic elements in the second discharge branch corresponding to phase A may be denoted as LA2, TA2, DA2 and the like respectively; the second inductor L2, the second switch transistor T2, the second freewheeling diode D2 and other electronic elements in the second discharge branch corresponding to phase B may be denoted as LB2, TB2, DB2 and the like respectively; and the second inductor L2, the second switch transistor T2, the second freewheeling diode D2 and other electronic elements in the second discharge branch corresponding to phase C may be denoted as LC2, TC2, DC2 and the like respectively, which are not described repeatedly in the present disclosure.

It also should be illustrated that, the inductor shown in FIG. 1 may refer to a PFC (Power Factor Correction) inductor, which is not described repeatedly in the present disclosure.

With the two-wire discharge circuit of the battery shown in FIG. 1, a Boost (boost) function can be realized without the neutral-wire connection of the battery. For example, taking phase A as an example, two PFC inductors, two switch transistors, two freewheeling diodes and the like in corresponding the first discharge branches and the second discharge branches can operate with the positive-bus capacitor and the negative-bus capacitor as a whole in an ideal situation. The battery can store energy by the PFC inductors when the switch transistors are turned on, and the battery and the PFC inductors can charge the bus capacitors via the freewheeling capacitors when the switch transistors are turned off, to realize the boost function. Also, in a case of three-phase control, the three phases may be interleaved by 120 degrees, therefore, current ripples of the battery are reduced greatly, and circuit performance is improved.

In practice, however, the two-wire discharge circuit of the battery is unable to operate in an ideal mode, since various factors may have adverse effects on the two-wire discharge circuit of the battery. For example, in a case that the switch transistors in the circuit have different action delays, a problem of bus voltage unbalance may occur, which results in abnormal operation of the circuit, and affecting operation performance of the circuit. Therefore, it is urgent to provide a circuit control solution for the two-wire discharge circuit of the battery, to solve the above problems.

SUMMARY

A method and a device for controlling a two-wire discharge circuit of a battery are provided according to the embodiments of the present disclosure, to solve the problem of low circuit performance caused by bus-voltage unbalance in the two-wire discharge circuit of the battery.

A method for controlling a two-wire discharge circuit of a battery is provided according to an embodiment of the present disclosure, which includes:

determining a positive-bus voltage and a negative-bus voltage in the two-wire discharge circuit of the battery, and comparing the positive-bus voltage with the negative-bus voltage to obtain a first voltage difference signal;

regulating the first voltage difference signal by a PI (proportional integral) regulator to obtain a first PWM (pulse-width modulation) signal;

for each of first discharge branches in the two-wire discharge circuit of the battery, taking a sum of the first PWM signal and a determined initial master control PWM signal corresponding to the first discharge branch as an adjusted master control PWM signal corresponding to the first discharge branch, and performing drive control on a switch transistor for controlling a charge-discharge time period of a bus capacitor in the first discharge branch by the adjusted master control PWM signal corresponding to the first discharge branch, where a terminal of the first discharge branch is connected to a positive electrode of a power supply in the two-wire discharge circuit of the battery, and the other terminal of the first discharge branch is connected to a system neutral point; and for each of second discharge branches in the two-wire discharge circuit of the battery, taking a difference between a determined initial master control PWM signal corresponding to the second discharge branch and the first PWM signal as an adjusted master control PWM signal corresponding to the second discharge branch, and performing drive control on a switch transistor for controlling a charge-discharge time period of a bus capacitor in the second discharge branch by the adjusted master control PWM signal corresponding to the second discharge branch, where a terminal of the second discharge branch is connected to a negative electrode of the power supply in the two-wire discharge circuit of the battery, and the other terminal of the second discharge branch is connected to the system neutral point, where for each of the discharge branches, the initial master control PWM signal corresponding to the discharge branch is obtained by controlling the two-wire discharge circuit of the battery in a dual-loop control manner including a full-bus voltage outer loop and a closed loop of an average value of inductor currents in the two-wire discharge circuit of the battery, or by controlling the discharge branch in a dual-loop control manner including a full-bus voltage outer loop and a closed loop of an actual value of an inductor current in the discharge branch.

Furthermore, a device for controlling a two-wire discharge circuit of a battery is further provided according to an embodiment of the present disclosure, which includes:

an initial signal determining module configured to: for each of discharge branches in the two-wire discharge circuit of the battery, obtain an initial master control PWM signal corresponding to the discharge branch by controlling the two-wire discharge circuit of the battery in a dual-loop control manner including a full-bus voltage outer loop and a closed loop of an average value of inductor currents in the two-wire discharge circuit of the battery or by controlling the discharge branch in a dual-loop control manner including a full-bus voltage outer loop and a closed loop of an actual value of an inductor current in the discharge branch;

a fine-adjusted signal determining module configured to: determine a positive-bus voltage and a negative-bus voltage in the two-wire discharge circuit of the battery, compare the positive-bus voltage with the negative-bus voltage to obtain a first voltage difference signal; regulate the first voltage difference signal by a PI regulator to obtain a first PWM signal; for each of first discharge branches in the two-wire discharge circuit of the battery, take a sum of the first PWM signal and the determined initial master control PWM signal corresponding to the first discharge branch as an adjusted master control PWM signal corresponding to the first discharge branch, where a terminal of the first discharge branch is connected to a positive electrode of a power supply in the two-wire discharge circuit of the battery, and the other terminal of the first discharge branch is connected to a system neutral point; and for each of second discharge branches in the two-wire discharge circuit of the battery, take a difference between the determined initial master control PWM signal corresponding to the second discharge branch and the first PWM signal as an adjusted master control PWM signal corresponding to the second discharge branch, where a terminal of the second discharge branch is connected to a negative electrode of the power supply in the two-wire discharge circuit of the battery, and the other terminal of the second discharge branch is connected to the system neutral point; and a circuit drive control module configured to, for each of the discharge branches in the two-wire discharge circuit of the battery, perform drive control on a switch transistor for controlling a charge-discharge time period of a bus capacitor in the discharge branch by the adjusted master control PWM signal corresponding to the discharge branch.

The present disclosure has advantageous effects as follows.

A method and a device for controlling a two-wire discharge circuit of a battery are provided according to the embodiments of the present disclosure, in the technical solution according to the embodiments of the present disclosure, a full-bus voltage outer loop and a closed-loop of an average value of inductor currents or an actual value of an inductor current are taken as a master control loop of the two-wire discharge circuit of the battery, in this way, power balance can be realized while ensuring a stable full-bus voltage, also in a case that the master control loop controls output, a duty ratio of a switch transistor in each of the discharge branches is adjusted to control the circuit to independently charge-discharge a half bus corresponding to the discharge branch, thereby balancing the bus voltage while realizing power balance, and further meeting technical indicators in the three-wire connection of the battery while omitting the neutral-wire connection of the battery and without adding an additional circuit, and improving circuit performance of the two-wire discharge circuit of the battery.

BRIEF DESCRIPTION OF THE DRAWINGS

In order to more clearly illustrate the technical solution in the embodiments of the present disclosure, in the following, drawings required in the description of the embodiments will be introduced simply. Apparently, the drawings in the following description are some embodiments of the disclosure. For those skilled in the art, other drawings can also be obtained according to the drawings without any creative work.

DETAILED DESCRIPTION OF THE EMBODIMENTS

In order to make the objective, the technical solution and the advantages of the present disclosure clearer, the present disclosure will be further described in detail below in conjunction with the drawings. Apparently, the described embodiments are only a part of the embodiments of the present disclosure, rather than all of the embodiments. All the other embodiments obtained by those skilled in the art based on the embodiments of the present disclosure without creative work will fall within the scope of protection of the present disclosure.

First Embodiment

Figure 2:
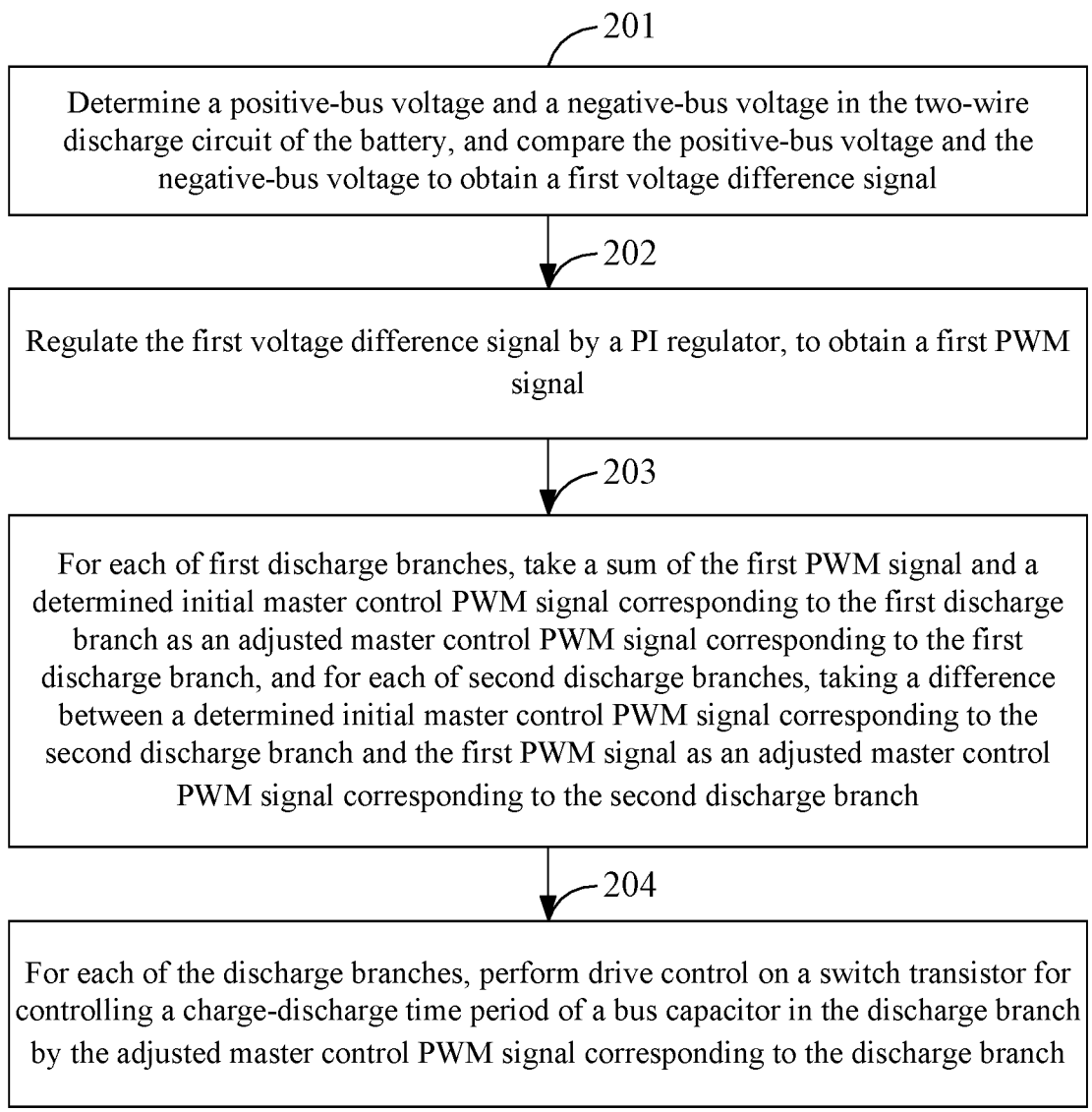
FIG. 2 is a schematic flow diagram of a method for controlling a two-wire discharge circuit of a battery according to a first embodiment of the present disclosure.

A method for controlling a two-wire discharge circuit of a battery is provided according to a first embodiment of the present disclosure, as shown in FIG. 2, which is a schematic flow diagram of a method for controlling a two-wire discharge circuit of a battery according to a first embodiment of the present disclosure, the method includes steps 201 to 204.

In step 201, a positive-bus voltage and a negative-bus voltage in the two-wire discharge circuit of the battery are determined, and the positive-bus voltage is compared with the negative-bus voltage to obtain a first voltage difference signal.

The determined positive-bus voltage and the determined negative-bus voltage refer to an actual positive-bus voltage and an actual negative-bus voltage, respectively, which are not described repeatedly in the embodiment of the present disclosure. In addition, the first voltage difference signal is obtained by subtracting the negative-bus voltage from the positive-bus voltage, which is not described repeatedly in the embodiment of the present disclosure.

In step 202, the first voltage difference signal is regulated by a PI regulator, to obtain a first PWM signal.

In step 203, for each of first discharge branches in the two-wire discharge circuit of the battery, a sum of the first PWM signal and a determined initial master control PWM signal corresponding to the first discharge branch is taken as an adjusted master control PWM signal corresponding to the first discharge branch. For each of second discharge branches in the two-wire discharge circuit of the battery, a difference between a determined initial master control PWM signal corresponding to the second discharge branch and the first PWM signal is taken as an adjusted master control PWM signal corresponding to the second discharge branch.

One terminal of the first discharge branch is connected to a positive electrode of a power supply in the two-wire discharge circuit of the battery, and the other terminal of the first discharge branch is connected to a system neutral point. One terminal of the second discharge branch is connected to a negative electrode of the power supply in the two-wire discharge circuit of the battery, and the other terminal of the second discharge branch is connected to the system neutral point.

In addition, for each of the discharge branches, the initial master control PWM signal corresponding to the discharge branch may be obtained by controlling the two-wire discharge circuit of the battery in a dual-loop control manner including a full-bus voltage outer loop and a closed loop of an average value of inductor currents (the average value of the inductor currents refers to an average value of actual values of inductor currents of all discharge branches in the two-wire discharge circuit of the battery, that is, an average value of inductor currents in the two-wire discharge circuit of the battery). Alternatively, the initial master control PWM signal corresponding to the discharge branch may be obtained by controlling the discharge branch in a dual-loop control manner including a full-bus voltage outer loop and a closed loop of an actual value of an inductor current of the discharge branch.

In step 204, for each of the discharge branches, drive control is performed on a switch transistor for controlling a charge-discharge time period of a bus capacitor in the discharge branch by the adjusted master control PWM signal corresponding to the discharge branch.

Figure 1:
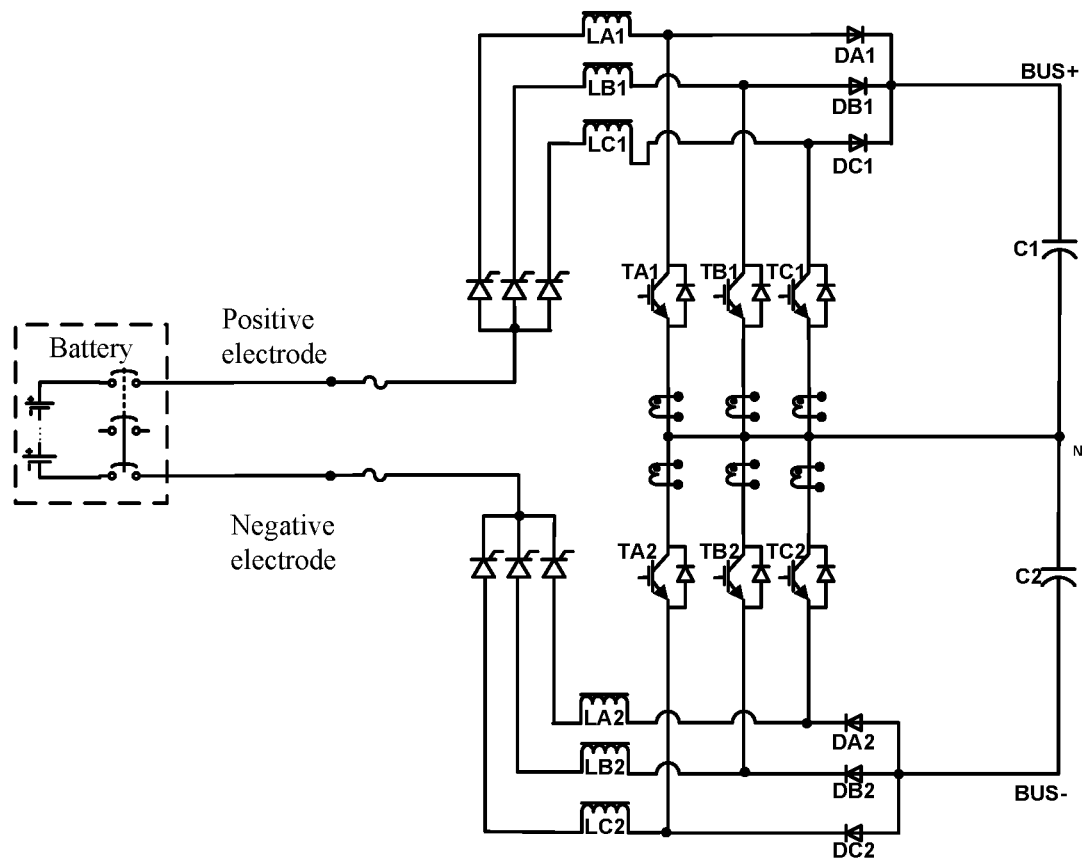
FIG. 1 is a possible schematic structural diagram of an existing two-wire discharge circuit of a battery.

Taking the two-wire discharge circuit of the battery shown in FIG. 1 as an example, for each of the discharge branches, the adjusted master control PWM signal corresponding to the discharge branch is inputted into a base of a TA transistor in the discharge branch, to perform drive control on the TA transistor.

That is, in the technical solution according to the embodiments of the present disclosure, a full-bus voltage outer loop and a closed-loop of an average value of inductor currents or an actual value of an inductor current are taken as a master control loop of the two-wire discharge circuit of the battery, in this way, power balance can be realized while ensuring a stable full-bus voltage, also in a case that the master control loop controls output, a duty ratio of a switch transistor in each of the discharge branches is adjusted to control the circuit to independently charge-discharge a half bus corresponding to the discharge branch, thereby balancing the bus voltage while realizing power balance, and further meeting technical indicators in the three-wire connection of the battery while omitting the neutral-wire connection of the battery and without adding an additional circuit, and improving circuit performance of the two-wire discharge circuit of the battery.

Figure 3:
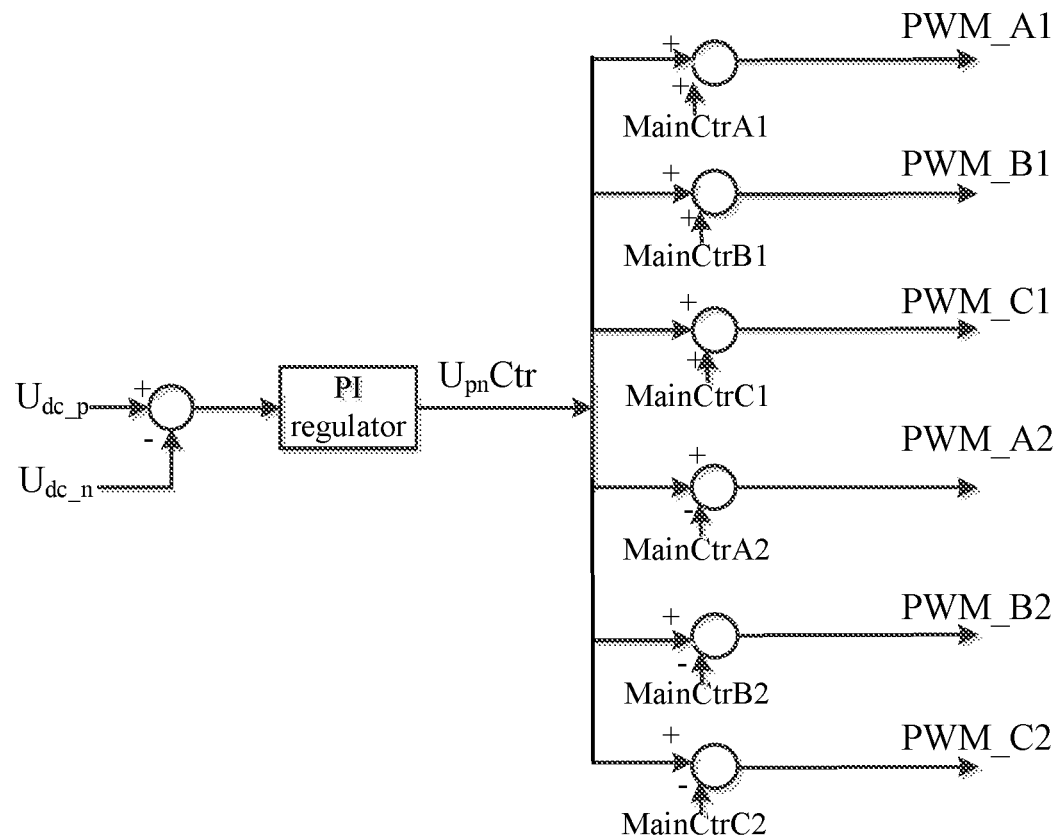
FIG. 3 is a first schematic diagram of an overall control circuit corresponding to the method for controlling the two-wire discharge circuit of the battery according to the embodiment of the present disclosure.

Taking the two-wire discharge circuit of the battery shown in FIG. 1 as an example, as shown in FIG. 3, which is a schematic diagram (a first schematic diagram of an overall control circuit) of an overall control circuit corresponding to the method for controlling the two-wire discharge circuit of the battery according to the first embodiment of the present disclosure, in which, $U_{dc\text{-}p}$ denotes a determined positive-bus voltage, $U_{dc\text{-}n}$ denotes a determined negative-bus voltage, $U_{pn}$Ctr denotes a first PWM signal, MainCtrA1, MainCtrB1, MainCtrC1, MainCtrA2, MainCtrB2 and MainCtrC2 denote as an initial master control PWM signal corresponding to an A-phase first discharge branch, an initial master control PWM signal corresponding to a B-phase first discharge branch, an initial master control PWM signal corresponding to a C-phase first discharge branch, an initial master control PWM signal corresponding to an A-phase second discharge branch, an initial master control PWM signal corresponding to a B-phase second discharge branch and an initial master control PWM signal corresponding to a C-phase second discharge branch in the two-wire discharge circuit of the battery, respectively. PWM_A1, PWM_B1, PWM_C1, PWM_A2, PWM_B2 and PWM_C2 denote as an adjusted master control PWM signal corresponding to the A-phase first discharge branch, an adjusted master control PWM signal corresponding to the B-phase first discharge branch, an adjusted master control PWM signal corresponding to the C-phase first discharge branch, an adjusted master control PWM signal corresponding to the A-phase second discharge branch, an adjusted master control PWM signal corresponding to the B-phase second discharge branch and an adjusted master control PWM signal corresponding to the C-phase second discharge branch in the two-wire discharge circuit of the battery, respectively.

It should be illustrated that in a case that the initial master control PWM signal corresponding to each of the discharge branches is obtained by controlling the two-wire discharge circuit of the battery in the dual-loop control manner including the full-bus voltage outer loop and the closed loop of the average value of the inductor currents, MainCtrA1, MainCtrB1, MainCtrC1, MainCtrA2, MainCtrB2 and MainCtrC2 may be a same master control signal MainCtr, which is not described repeatedly in the embodiment of the present disclosure.

It should be further illustrated that, according to analysis on an operation principle of the circuit, a duty ratio of a switch transistor is reduced to increase a half-bus voltage corresponding to the switch transistor, which is opposite to an operation principle of the Boost, otherwise, positive feedback is formed in the circuit. Therefore, in the embodiment of the present disclosure, for each of the first discharge branches in the two-wire discharge circuit of the battery, the sum of the first PWM signal and the determined initial master control PWM signal corresponding to the first discharge branch is taken as the adjusted master control PWM signal corresponding to the first discharge branch, also, for each of the second discharge branches in the two-wire discharge circuit of the battery, a difference between the determined initial master control PWM signal corresponding to the second discharge branch and the first PWM signal is taken as the adjusted master control PWM signal corresponding to the second discharge branch, which are not described repeatedly in the embodiment of the present disclosure.

Optionally, in a case that for any one of the discharge branches, the initial master control PWM signal corresponding to the discharge branch is obtained by controlling the two-wire discharge circuit of the battery in a dual-loop control manner including a full-bus voltage outer loop and a closed loop of an average value of inductor currents, the initial master control PWM corresponding to the discharge branch is determined by:

comparing a sum of the determined positive-bus voltage and the determined negative-bus voltage in the two-wire discharge circuit of the battery with a given value of a preset bus voltage, to obtain a second voltage difference signal;

regulating the second voltage difference signal by a PI regulator to obtain a given value of an inductor current;

comparing the given value of the inductor current with an average value of inductor currents in the two-wire discharge circuit of the battery, to obtain a first current difference signal; and regulating the first current difference signal by a PI regulator, to obtain a second PWM signal, and taking a sum of the second PWM signal and a preset feedforward signal as an initial master control PWM signal corresponding to the discharge branch.

Figure 4:
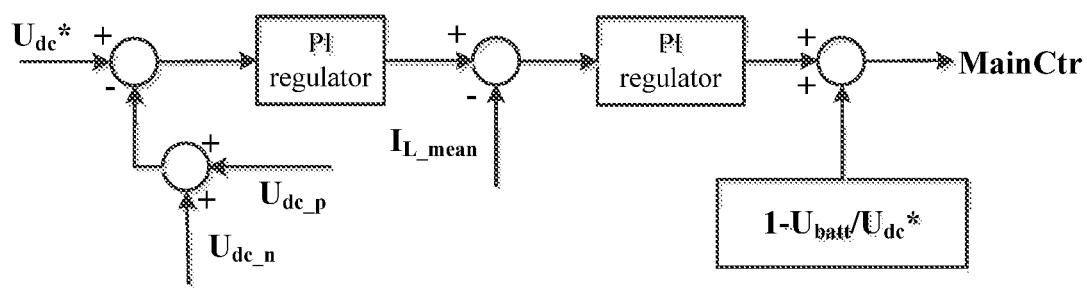
FIG. 4 is a schematic diagram of a circuit corresponding to a dual-loop control manner including a full-bus voltage outer loop and a closed-loop of an average value of inductor currents according to the embodiment of the present disclosure.

A schematic diagram showing a circuit corresponding to the dual-loop control manner including the full-bus voltage outer loop and the closed loop of the average value of the inductor currents may be as shown in FIG. 4, in which, $U_{dc\_p}$ denotes a determined positive-bus voltage, $U_{dc\_n}$ denotes a determined negative-bus voltage, $U_{dc}^{*}$ denotes a given value of a preset bus voltage (which is adjusted and set according to actual situations, and is not described repeatedly in the embodiment of the present disclosure), $I_{L\_mean}$ denotes an average value of inductor currents in the two-wire discharge circuit of the battery, $1-U_{batt}/U_{dc}^{*}$ denotes a preset feedforward signal, $U_{batt}$ denotes a power supply voltage of a power supply in the two-wire discharge circuit of the battery, and MainCtr denotes an initial master control PWM signal corresponding to the discharge branch.

Furthermore, in a case that for any one of the discharge branches, the initial master control PWM signal corresponding to the discharge branch is obtained by controlling the discharge branch in a dual-loop control manner including a full-bus voltage outer loop and a closed loop of an actual value of an inductor current in the discharge branch, the initial master control PWM signal corresponding to the discharge branch is determined by:

comparing a sum of the determined positive-bus voltage and the determined negative-bus voltage in the two-wire discharge circuit of the battery with a given value of a preset bus voltage, to obtain a second voltage difference signal;

regulating the second voltage difference signal by a PI regulator, to obtain a given value of an inductor current;

comparing the given value of the inductor current with an actual value of the inductor current in the discharge branch, to obtain a second current difference signal; and regulating the second current difference signal by a PI regulator to obtain a third PWM signal, and taking a sum of the third PWM signal and a preset feedforward signal as an initial master control PWM signal corresponding to the discharge branch.

Figure 5:
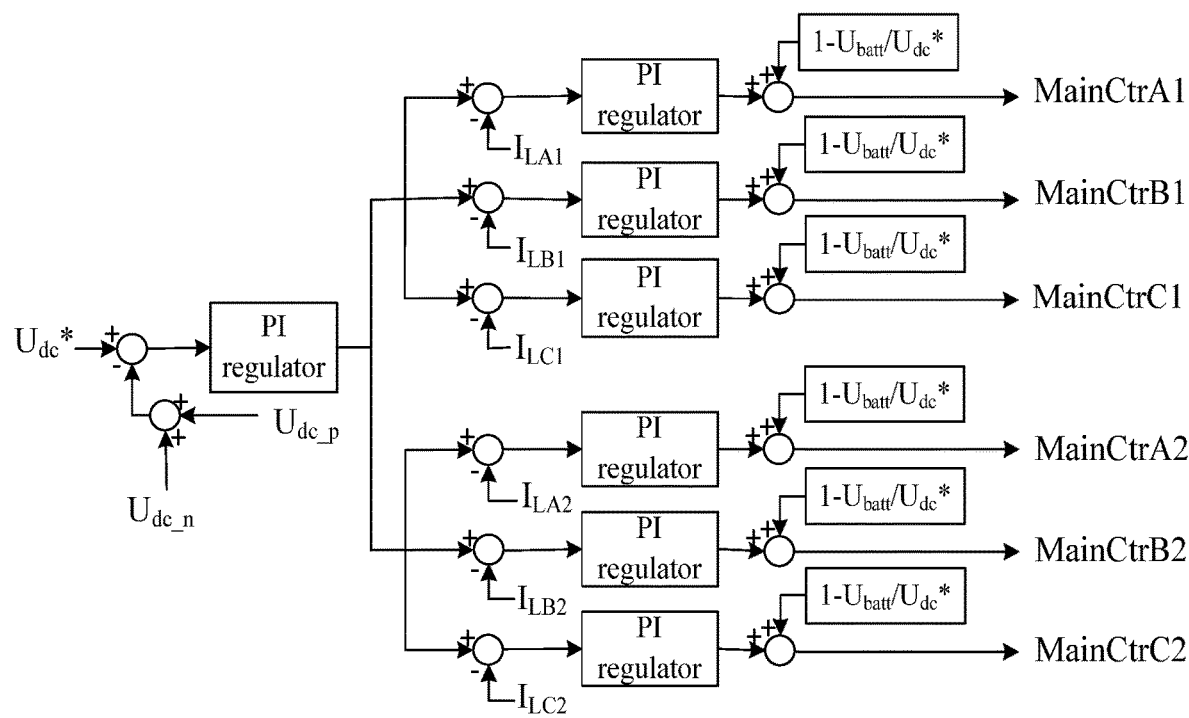
FIG. 5 is a schematic diagram of a circuit corresponding to a dual-loop control manner including a full-bus voltage outer loop and a closed-loop of an actual value of an inductor current according to the embodiment of the present disclosure.

Assumed that a schematic structural diagram of the two-wire discharge circuit of the battery may be as shown in FIG. 1, a schematic diagram showing a circuit corresponding to the dual-loop control manner including the full-bus voltage outer loop and the closed loop of the actual value of the inductor current may be as shown in FIG. 5, in which, $U_{dc\_p}$ denotes a determined positive-bus voltage, $U_{dc\_n}$ denotes a determined negative-bus voltage, $U_{dc}^*$ denotes a given value of a preset bus voltage, $1-U_{batt}/U_{dc}^*$ denotes a preset feedforward signal, $U_{batt}$ denotes a power supply voltage of a power supply in the two-wire discharge circuit of the battery, $I_{LA1}$, $I_{LB1}$, $I_{LC1}$, $I_{LA2}$, $I_{LB2}$ and $I_{LC2}$ denote an actual value of an inductor current in an A-phase first discharge branch, an actual value of an inductor current in a B-phase first discharge branch, an actual value of an inductor current in a C-phase first discharge branch, an actual value of an inductor current in an A-phase second discharge branch, an actual value of an inductor current in a B-phase second discharge branch and an actual value of an inductor current in a C-phase second discharge branch in the two-wire discharge circuit of the battery, respectively, and MainCtrA1, MainCtrB1, MainCtrC1, MainCtrA2, MainCtrB2 and MainCtrC2 denote an initial master control PWM signal corresponding to the A-phase first discharge branch, an initial master control PWM signal corresponding to the B-phase first discharge branch, an initial master control PWM signal corresponding to the C-phase first discharge branch, an initial master control PWM signal corresponding to the A-phase second discharge branch, an initial master control PWM signal corresponding to the B-phase second discharge branch and an initial master control PWM signal corresponding to the C-phase second discharge branch in the two-wire discharge circuit of the battery, respectively.

Figure 6:
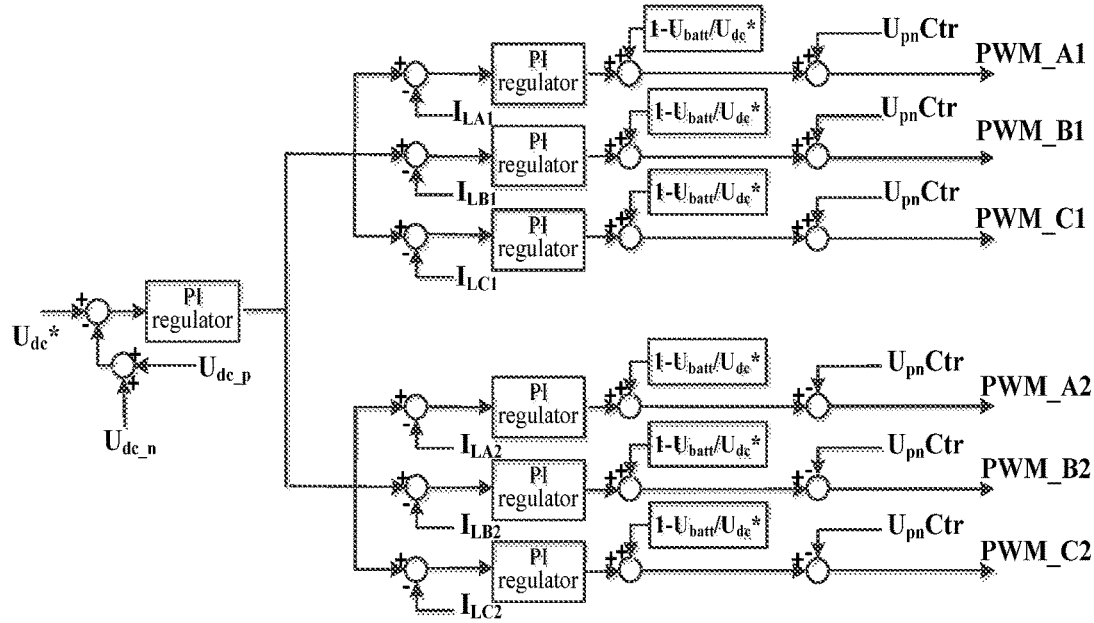
FIG. 6 is a second schematic diagram of an overall control circuit corresponding to the method for controlling the two-wire discharge circuit of the battery according to the embodiment of the present disclosure.

Furthermore, based on the circuit shown in FIG. 2, a schematic diagram showing an overall control circuit (that is, a second schematic diagram of the overall control circuit) corresponding to the method for controlling the two-wire discharge circuit of the battery according to the first embodiment of the present disclosure may be as shown in FIG. 6, in which, the initial master control PWM signal corresponding to each of the discharge branches is fine-adjusted by the $U_{pn}$Ctr (first PWM signal), to obtain an adjusted master control PWM signal corresponding to the discharge branch. In FIG. 6, PWM_A1, PWM_B1, PWM_C1, PWM_A2, PWM_B2 and PWM_C2 denote an adjusted master control PWM signal corresponding to the A-phase first discharge branch, an adjusted master control PWM signal corresponding to the B-phase first discharge branch, an adjusted master control PWM signal corresponding to the C-phase first discharge branch, an adjusted master control PWM signal corresponding to the A-phase second discharge branch, an adjusted master control PWM signal corresponding to the B-phase second discharge branch and an adjusted master control PWM signal corresponding to the C-phase second discharge branch, respectively, which are not described repeatedly in the embodiment of the present disclosure.

It should be illustrated that, in a case that the initial master control PWM signal corresponding to each discharge branch is obtained by controlling the discharge branch in a dual-loop control manner including the full-bus voltage outer loop and the closed loop of the actual value of the inductor current in the discharge branch, the actual value of the inductor current in the discharge branch is adjusted by the determined given value of the inductor current, to realize current sharing for the inductor current, and further reduce discharge ripples of the battery and improve circuit performance.

Furthermore, it should be illustrated that assumed that a schematic structural diagram of the two-wire discharge circuit of the battery is as shown in FIG. 1, in a case that the initial master control PWM signal corresponding to the discharge branch is obtained by controlling the discharge branch in the dual-loop control manner including the full-bus voltage outer loop and the closed loop of the actual value of the inductor current in the discharge branch, since a control degree of freedom of an inner-loop inductor current is equal to 5, six inductor currents or five inductor currents are introduced to realize a same control effect, that is, the number of control branches in the schematic diagram of the circuit shown in FIG. 6 may be six or five (that is, a control branch corresponding to any one discharge branch can be removed), which is not limited in the embodiment of the present disclosure.

Furthermore, in a case that for any one of the discharge branches, the initial master control PWM signal corresponding to the discharge branch is obtained by controlling the two-wire discharge circuit of the battery in the dual-loop control manner including the full-bus voltage outer loop and the closed loop of the average value of the inductor currents in the two-wire discharge circuit of the battery, the method further includes: for each of the discharge branches in the two-wire discharge circuit of the battery, comparing the average value of the inductor currents in the two-wire discharge circuit of the battery with the actual value of the inductor current in the discharge branch, to obtain a third current difference signal;

regulating the third current difference signal by a PI regulator to obtain a fourth PWM signal; and adding the fourth PWM signal and the adjusted master control PWM signal corresponding to the discharge branch to obtain a readjusted master control PWM signal corresponding to the discharge branch, and performing drive control on a switch transistor for controlling a charge-discharge time period of a bus capacitor in the discharge branch by the readjusted master control PWM signal corresponding to the discharge branch.

In a case that the initial master control PWM signal corresponding to the discharge branch is obtained by controlling the two-wire discharge circuit of the battery in the dual-loop control manner including the full-bus voltage outer loop and the closed loop of the average value of the inductor currents, for each of the discharge branches, a PWM signal obtained by performing PI regulation on a difference between the average value of the inductor currents and the actual value of the inductor current in the discharge branch is taken as a fine-adjusting amount of a modulation wave of the discharge branch, and the fine-adjusting amount is added into a control amount of a duty ratio of a switch transistor in the discharge branch, to realize current sharing of the inductor current and further reduce discharge ripples of the battery and improve performance of the circuit.

Figure 7:
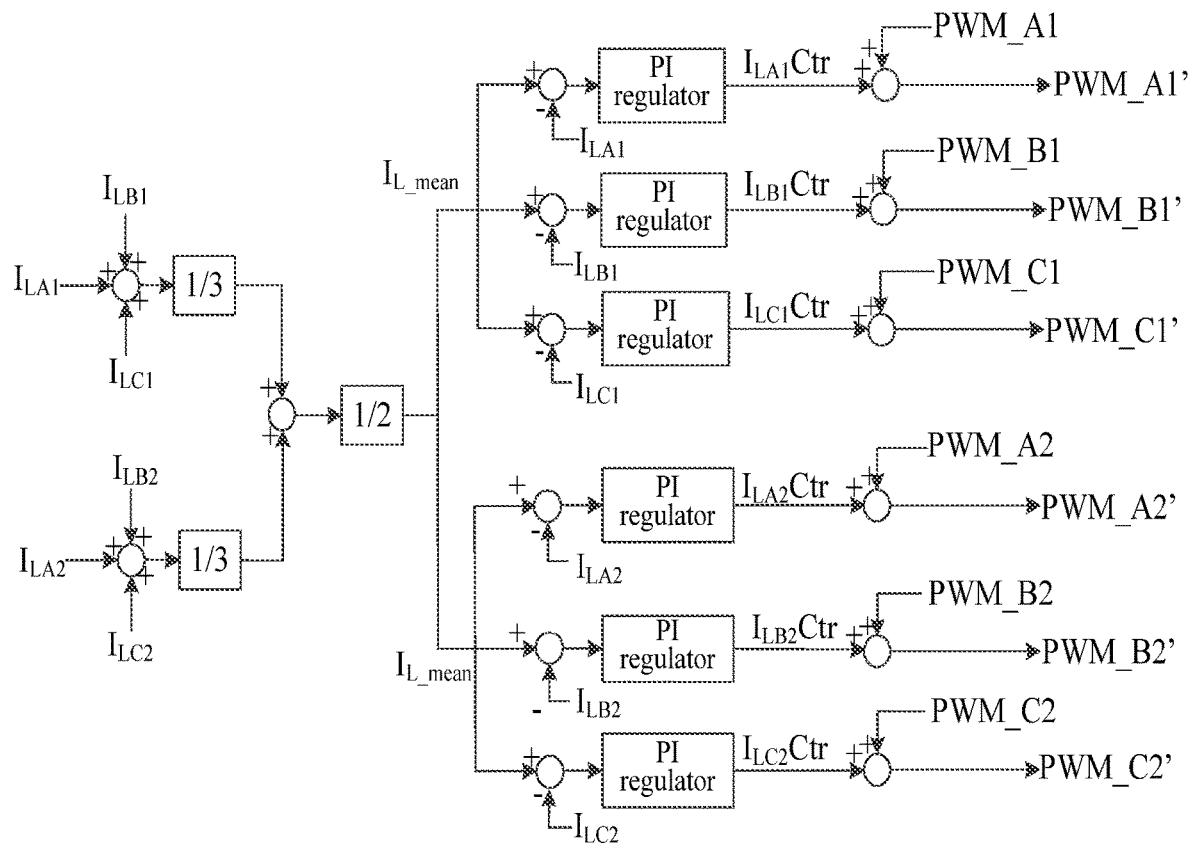
FIG. 7 is a third schematic diagram of an overall control circuit corresponding to the method for controlling the two-wire discharge circuit of the battery according to the embodiment of the present disclosure.

Assumed that a schematic structural diagram of the two-wire discharge circuit of the battery is as shown in FIG. 1, a schematic diagram of an overall control circuit (that is, a third schematic diagram of the overall control circuit) corresponding to the method for controlling the two-wire discharge circuit of the battery according to the first embodiment of the present disclosure is as shown in FIG. 7, in which, $I_{LA1}$, $I_{LB1}$, $I_{LC1}$, $I_{LA2}$, $I_{LB2}$ and $I_{LC2}$ denote an actual value of an inductor current in the A-phase first discharge branch, an actual value of an inductor current in the B-phase first discharge branch, an actual value of an inductor current in the C-phase first discharge branch, an actual value of an inductor current in the A-phase second discharge branch, an actual value of an inductor current in the B-phase second discharge branch and an actual value of an inductor current in the C-phase second discharge branch, in the two-wire discharge circuit of the battery, respectively. $I_{L\_mean}$ denotes an average value of the inductor currents in the two-wire discharge circuit of the battery.

$I_{LA1}$Ctr, $I_{LB1}$Ctr, $I_{LC1}$Ctr, $I_{LA2}$Ctr, $I_{LB2}$Ctr and $I_{LC2}$Ctr denote a fourth PWM signal corresponding to the A-phase first discharge branch, a fourth PWM signal corresponding to the B-phase first discharge branch, a fourth PWM signal corresponding to the C-phase first discharge branch, a fourth PWM signal corresponding to the A-phase second discharge branch, a fourth PWM signal corresponding to the B-phase second discharge branch and a fourth PWM signal corresponding to the C-phase second discharge branch in the two-wire discharge circuit of the battery, respectively.

PWM_A1, PWM_B1, PWM_C1, PWM_A2, PWM_B2 and PWM_C2 denote an adjusted master control PWM signal corresponding to the A-phase first discharge branch, an adjusted master control PWM signal corresponding to the B-phase first discharge branch, an adjusted master control PWM signal corresponding to the C-phase first discharge branch, an adjusted master control PWM signal corresponding to the A-phase second discharge branch, an adjusted master control PWM signal corresponding to the B-phase second discharge branch and an adjusted master control PWM signal corresponding to the C-phase second discharge branch in the two-wire discharge circuit of the battery, respectively.

PWM_A1', PWM_B1', PWM_C1', PWM_A2', PWM_B2' and PWM_C2' denote a readjusted master control PWM signal corresponding to the A-phase first discharge branch, a readjusted master control PWM signal corresponding to the B-phase first discharge branch, a readjusted master control PWM signal corresponding to the C-phase first discharge branch, a readjusted master control PWM signal corresponding to the A-phase second discharge branch, a readjusted master control PWM signal corresponding to the B-phase second discharge branch and a readjusted master control PWM signal corresponding to the C-phase second discharge branch in the two-wire discharge circuit of the battery, respectively.

The method for controlling the two-wire discharge circuit of the battery is provided according to the first embodiment of the present disclosure, in the technical solution according to the first embodiment of the present disclosure, a full-bus voltage outer loop and a closed-loop of an average value of inductor currents or an actual value of an inductor current are taken as a master control loop of the two-wire discharge circuit of the battery, in this way, power balance can be realized while ensuring a stable full-bus voltage, also in a case that the master control loop controls output, a duty ratio of a switch transistor in each of the discharge branches is adjusted to control the circuit to independently charge-discharge a half bus corresponding to the discharge branch, thereby balancing the bus voltage while realizing power balance, and further meeting technical indicators in the three-wire connection of the battery while omitting the neutral-wire connection of the battery and without adding an additional circuit, and improving circuit performance of the two-wire discharge circuit of the battery.

In addition, in the technical solution according to the first embodiment of the present disclosure, for each of the discharge branches, a PWM signal obtained by performing PI regulation on a difference between the average value of the inductor currents and the actual value of the inductor current in the discharge branch is taken as a fine-adjusting amount of a modulation wave of the discharge branch, and the fine-adjusting amount is added into a control amount of a duty ratio of a switch transistor in the discharge branch, to realize current sharing of the inductor current while balancing the bus voltage, and further reduce discharge ripples of the battery and improve circuit performance.

Second Embodiment

Figure 8:
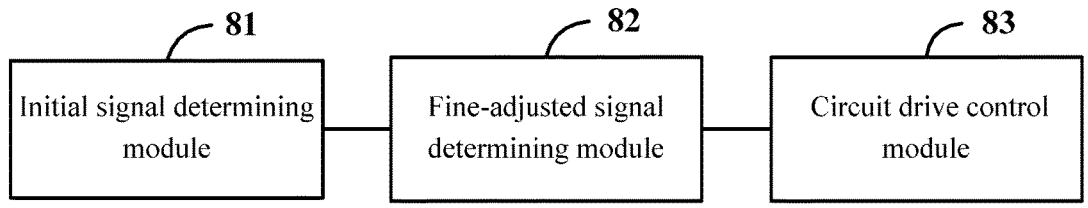
FIG. 8 is a schematic structural diagram of a device for controlling a two-wire discharge circuit of a battery according to a second embodiment of the present disclosure.

Based on a same inventive concept, a device for controlling a two-wire discharge circuit of a battery is provided according to a second embodiment of the present disclosure, implementation for the device may refer to related description in the first embodiment of the method, repetitions will not be omitted here. As shown in FIG. 8, which is a schematic structural diagram of a device for controlling a two-wire discharge circuit of a battery according to the second embodiment of the present disclosure, the device may include an initial signal determining module 81, a fine-adjusted signal determining module 82 and a circuit drive control module 83.

The initial signal determining module 81 is configured to: for each of discharge branches in the two-wire discharge circuit of the battery, obtain an initial master control PWM signal corresponding to the discharge branch by controlling the two-wire discharge circuit of the battery in a dual-loop control manner including a full-bus voltage outer loop and a closed loop of an average value of inductor currents in the two-wire discharge circuit of the battery or by controlling the discharge branch in a dual-loop control manner including a full-bus voltage outer loop and a closed loop of an actual value of an inductor current in the discharge branch.

The fine-adjusted signal determining module 82 is configured to: determine a positive-bus voltage and a negative-bus voltage in the two-wire discharge circuit of the battery, compare the positive-bus voltage with the negative-bus voltage to obtain a first voltage difference signal; and regulate the first voltage difference signal by a PI regulator to obtain a first PWM signal; for each of first discharge branches in the two-wire discharge circuit of the battery, take a sum of the first PWM signal and the determined initial master control PWM signal corresponding to the first discharge branch as an adjusted master control PWM signal corresponding to the first discharge branch, where a terminal of the first discharge branch is connected to a positive electrode of a power supply in the two-wire discharge circuit of the battery, and the other terminal of the first discharge branch is connected to a system neutral point; and for each of second discharge branches in the two-wire discharge circuit of the battery, take a difference between the determined initial master control PWM signal corresponding to the second discharge branch and the first PWM signal as an adjusted master control PWM signal corresponding to the second discharge branch, where a terminal of the second discharge branch is connected to a negative electrode of the power supply in the two-wire discharge circuit of the battery, and the other terminal of the second discharge branch is connected to the system neutral point.

The circuit drive control module 83 is configured to, for each of the discharge branches in the two-wire discharge circuit of the battery, perform drive control on a switch transistor for controlling a discharge-charge time period of a bus capacitor in the discharge branch by the adjusted master control PWM signal corresponding to the discharge branch.

Optionally, the initial signal determining module 81 may be configured to: compare a sum of the determined positive-bus voltage and the determined negative-bus voltage in the two-wire discharge circuit of the battery with a given value of a preset bus voltage to obtain a second voltage difference signal; regulate the second voltage difference signal by a PI regulator to obtain a given value of an inductor current; compare the given value of the inductor current with the average value of the inductor currents in the two-wire discharge circuit of the battery to obtain a first current difference signal; regulate the first current difference signal by a PI regulator to obtain a second PWM signal; and take a sum of the second PWM signal and a preset feedforward signal as the initial master control PWM signal corresponding to the discharge branch in the two-wire discharge circuit of the battery.

Furthermore, the initial signal determining module 81 may be particularly configured to: compare the sum of the determined positive-bus voltage and the determined negative-bus voltage in the two-wire discharge circuit of the battery with a given value of a preset bus voltage to obtain a second voltage difference signal; regulate the second voltage difference signal by a PI regulator to obtain a given value of an inductor current; and for each of the discharge branches, compare the given value of the inductor current with an actual value of an inductor current in the discharge branch to obtain a second current difference signal, regulate the second current difference signal by a PI regulator to obtain a third PWM signal, and take a sum of the third PWM signal and a preset feedforward signal as an initial master control PWM signal corresponding to the discharge branch.

Furthermore, the fine-adjusted signal determining module 82 may be further configured to: for any one of the discharge branches, in a case that the initial master control PWM signal corresponding to the discharge branch is obtained by controlling the two-wire discharge circuit of the battery in the dual-loop control manner including the full-bus voltage outer loop and the closed loop of the average value of the inductor currents in the two-wire discharge circuit of the battery, compare the average value of the inductor currents in the two-wire discharge circuit of the battery with the actual value of the inductor current in the discharge branch to obtain a third current difference signal; regulate the third current difference signal by a PI regulator, to obtain a fourth PWM signal; and add the fourth PWM signal and the adjusted master control PWM signal corresponding to the discharge branch, to obtain a readjusted master control PWM signal corresponding to the discharge branch.

Correspondingly, the circuit drive control module 83 may be further configured to, for each of the discharge branches in the two-wire discharge circuit of the battery, perform drive control on a switch transistor for controlling a charge-discharge time period of a bus capacitor in the discharge branch by the readjusted master control PWM signal corresponding to the discharge branch.

The preset feedforward signal is denoted as $1-U_{batt}/U_{dc}*$, $U_{batt}$ denotes a power supply voltage of the power supply in the two-wire discharge circuit of the battery, and $U_{dc}*$ denotes a given value of the preset bus voltage.

It should be further illustrated that the PI regulators in the embodiments of the present disclosure may be separated from the device for controlling the two-wire discharge circuit of the battery, or may be integrated in the device for controlling the two-wire discharge circuit of the battery, which is not described repeatedly in the embodiment of the present disclosure.

That is, in the technical solution according to the second embodiment of the present disclosure, a full-bus voltage outer loop and a closed-loop of an average value of inductor currents or an actual value of an inductor current are taken as a master control loop of the two-wire discharge circuit of the battery, in this way, power balance can be realized while ensuring a stable full-bus voltage, also in a case that the master control loop controls output, a duty ratio of a switch transistor in each of the discharge branches is adjusted to control the circuit to independently charge-discharge a half bus corresponding to the discharge branch, thereby balancing the bus voltage while realizing power balance, and further meeting technical indicators in the three-wire connection of the battery while omitting the neutral-wire connection of the battery and without adding an additional circuit, and improving circuit performance of the two-wire discharge circuit of the battery.

In addition, in the technical solution according to the second embodiment of the present disclosure, for each of the discharge branches, a PWM signal obtained by performing PI regulation on a difference between the average value of the inductor currents and an actual value of the inductor current in the discharge branch is taken as a fine-adjusting amount of a modulation wave of the discharge branch, and the fine-adjusting amount is added into a control amount of a duty ratio of a switch transistor in the discharge branch, to realize current sharing of the inductor current, and further reduce discharge ripples of the battery and improve circuit performance.

Although the preferred embodiments of the present disclosure are described, additional alternations and modifications can be made by those skilled in the art once knowing base inventive concept, the appended claims are intended to cover the preferred embodiments and all alternations and modifications within the scope of the present disclosure.

Apparently, those skilled in the art can make various changes and variations on the present disclosure without departing from the spirit and scope of the present disclosure, in this case, the present disclosure is intended to cover these changes and variations if the changes and variations of the present disclosure fall within the scope of the claims of the present disclosure and equivalent technology thereof.

The invention claimed is:

1. A method for controlling a two-wire discharge circuit of a battery, comprising:

determining a positive-bus voltage and a negative-bus voltage in the two-wire discharge circuit of the battery, and comparing the positive-bus voltage with the negative-bus voltage to obtain a first voltage difference signal;

regulating the first voltage difference signal by a proportional integral (PI) regulator, to obtain a first pulse width modulation (PWM) signal;

for each of first discharge branches in the two-wire discharge circuit of the battery, taking a sum of the first PWM signal and a determined initial master control PWM signal corresponding to the first discharge branch as an adjusted master control PWM signal corresponding to the first discharge branch, and performing drive control on a switch transistor for controlling a charge-discharge time period of a bus capacitor in the first discharge branch by the adjusted master control PWM signal corresponding to the first discharge branch, wherein a terminal of the first discharge branch is connected to a positive electrode of a power supply in the two-wire discharge circuit of the battery, and the other terminal of the first discharge branch is connected to a system neutral point; and for each of second discharge branches in the two-wire discharge circuit of the battery, taking a difference between a determined initial master control PWM signal corresponding to the second discharge branch and the first PWM signal as an adjusted master control PWM signal corresponding to the second discharge branch, and performing drive control on a switch transistor for controlling a charge-discharge time period of a bus capacitor in the second discharge branch by the adjusted master control PWM signal corresponding to the second discharge branch, wherein a terminal of the second discharge branch is connected to a negative electrode of the power supply in the two-wire discharge circuit of the battery, and the other terminal of the second discharge branch is connected to the system neutral point;

wherein for any one of the discharge branches, the initial master control PWM signal corresponding to the discharge branch is obtained by controlling the two-wire discharge circuit of the battery in a dual-loop control manner comprising a full-bus voltage outer loop and a closed loop of an average value of inductor currents in the two-wire discharge circuit of the battery, or by controlling the discharge branch in a dual-loop control manner comprising a full-bus voltage outer loop and a closed loop of an actual value of an inductor current in the discharge branch.

2. The method for controlling the two-wire discharge circuit of the battery according to claim 1, wherein in a case that for any one of the discharge branches, the initial master control PWM signal corresponding to the discharge branch is obtained by controlling the two-wire discharge circuit of the battery in the dual-loop control manner comprising the full-bus voltage outer loop and the closed loop of the average value of the inductor currents in the two-wire discharge circuit of the battery, the initial master control PWM signal corresponding to the discharge branch is determined by:

comparing a sum of the determined positive-bus voltage and the determined negative-bus voltage in the two-wire discharge circuit of the battery with a given value of a preset bus voltage, to obtain a second voltage difference signal;

regulating the second voltage difference signal by a PI regulator to obtain a given value of an inductor current;

comparing the given value of the inductor current with the average value of the inductor currents in the two-wire discharge circuit of the battery, to obtain a first current difference signal; and regulating the first current difference signal by a PI regulator to obtain a second PWM signal, and taking a sum of the second PWM signal and a preset feedforward signal as the initial master control PWM signal corresponding to the discharge branch.

3. The method for controlling the two-wire discharge circuit of the battery according to claim 1, wherein in a case that for any one of the discharge branches, the initial master control PWM signal corresponding to the discharge branch is obtained by controlling the discharge branch in the dual-loop control manner comprising the full-bus voltage outer loop and the closed loop of the actual value of the inductor current in the discharge branch, the initial master control PWM signal corresponding to the discharge branch is determined by:

comparing a sum of the determined positive-bus voltage and the determined negative-bus voltage in the two-wire discharge circuit of the battery with a given value of a preset bus voltage, to obtain a second voltage difference signal;

regulating the second voltage difference signal by a PI regulator to obtain a given value of the inductor current;

comparing the given value of the inductor current with the actual value of the inductor current in the discharge branch to obtain a second current difference signal; and regulating the second current difference signal by a PI regulator to obtain a third PWM signal, and taking a sum of the third PWM signal and a preset feedforward signal as the initial master control PWM signal corresponding to the discharge branch.

4. The method for controlling the two-wire discharge circuit of the battery according to claim 1, wherein in a case that for any one of the discharge branches, the initial master control PWM signal corresponding to the discharge branch is obtained by controlling the two-wire discharge circuit of the battery in the dual-loop control manner comprising the full-bus voltage outer loop and the closed loop of the average value of the inductor currents in the two-wire discharge circuit of the battery, the method further comprises: for each of the discharge branches in the two-wire discharge circuit of the battery, comparing the average value of the inductor currents in the two-wire discharge circuit of the battery with an actual value of an inductor current in the discharge branch, to obtain a third current difference signal;

regulating the third current difference signal by a PI regulator to obtain a fourth PWM signal; and adding the fourth PWM signal and the adjusted master control PWM signal corresponding to the discharge branch to obtain a readjusted master control PWM signal corresponding to the discharge branch, and performing drive control on the switch transistor for controlling the charge-discharge time period of the bus capacitor in the discharge branch by the readjusted master control PWM signal corresponding to the discharge branch.

5. The method for controlling the two-wire discharge circuit of the battery according to claim 2, wherein the preset feedforward signal is denoted as $1-U_{batt}/U_{dc}^*$, $U_{batt}$ denotes a power supply voltage of a power supply in the two-wire discharge circuit of the battery, and $U_{dc}^*$ denotes a given value of a preset bus voltage.

6. A device for controlling a two-wire discharge circuit of a battery, comprising:

an initial signal determining module configured to: for each of discharge branches in the two-wire discharge circuit of the battery, obtain an initial master control PWM signal corresponding to the discharge branch by controlling the two-wire discharge circuit of the battery in a dual-loop control manner comprising a full-bus voltage outer loop and a closed loop of an average value of inductor currents in the two-wire discharge circuit of the battery or by controlling the discharge branch in a dual-loop control manner comprising a full-bus voltage outer loop and a closed loop of an actual value of an inductor current in the discharge branch;

a fine-adjusted signal determining module configured to: determine a positive-bus voltage and a negative-bus voltage in the two-wire discharge circuit of the battery, compare the positive-bus voltage with the negative-bus voltage to obtain a first voltage difference signal; regulate the first voltage difference signal by a proportional integral (PI) regulator to obtain a first PWM signal; for each of first discharge branches in the two-wire discharge circuit of the battery, take a sum of the first PWM signal and the determined initial master control PWM signal corresponding to the first discharge branch as an adjusted master control PWM signal corresponding to the first discharge branch, wherein a terminal of the first discharge branch is connected to a positive electrode of a power supply in the two-wire discharge circuit of the battery, and the other terminal of the first discharge branch is connected to a system neutral point; and for each of second discharge branches in the two-wire discharge circuit of the battery, take a difference between the determined initial master control PWM signal corresponding to the second discharge branch and the first PWM signal as an adjusted master control PWM signal corresponding to the second discharge branch, wherein a terminal of the second discharge branch is connected to a negative electrode of the power supply in the two-wire discharge circuit of the battery, and the other terminal of the second discharge branch is connected to the system neutral point; and a circuit drive control module configured to, for each of the discharge branches in the two-wire discharge circuit of the battery, perform drive control on a switch transistor for controlling a charge-discharge time period of a bus capacitor in the discharge branch by the adjusted master control PWM signal corresponding to the discharge branch.

7. The device for controlling the two-wire discharge circuit of the battery according to claim 6, wherein the initial signal determining module is configured to:

compare a sum of the determined positive-bus voltage and the determined negative-bus voltage in the two-wire discharge circuit of the battery with a given value of a preset bus voltage to obtain a second voltage difference signal;

regulate the second voltage difference signal by a PI regulator to obtain a given value of an inductor current;

compare the given value of the inductor current with the average value of the inductor currents in the two-wire discharge circuit of the battery, to obtain a first current difference signal; and regulate the first current difference signal by a PI regulator to obtain a second PWM signal, and take a sum of the second PWM signal and a preset feedforward signal as the initial master control PWM signal corresponding to each of the discharge branches in the two-wire discharge circuit of the battery.

8. The device for controlling the two-wire discharge circuit of the battery according to claim 6, wherein the initial signal determining module is configured to:

compare a sum of the determined positive-bus voltage and the determined negative-bus voltage in the two-wire discharge circuit of the battery with a given value of a preset bus voltage, to obtain a second voltage difference signal;

regulate the second voltage difference signal by a PI regulator to obtain a given value of the inductor current; and for each of the discharge branches, compare the given value of the inductor current with an actual value of an inductor current in the discharge branch to obtain a second current difference signal, regulate the second current difference signal by a PI regulator to obtain a third PWM signal, and take a sum of the third PWM signal and a preset feedforward signal as the initial master control PWM signal corresponding to the discharge branch.

9. A device for controlling the two-wire discharge circuit of the battery according to claim 6, wherein the fine-adjusted signal determining module is configured to: in a case that for any one of the discharge branches, the initial master control PWM signal corresponding to the discharge branch is obtained by controlling the two-wire discharge circuit of the battery in the dual-loop control manner comprising the full-bus voltage outer loop and the closed loop of the average value of the inductor currents in the two-wire discharge circuit of the battery, compare the average value of the inductor currents in the two-wire discharge circuit of the battery with an actual value of an inductor current in the discharge branch, to obtain a third current difference signal;

regulate the third current difference signal by a PI regulator to obtain a fourth PWM signal; and add the fourth PWM signal and the adjusted master control PWM signal corresponding to the discharge branch to obtain a readjusted master control PWM signal corresponding to the discharge branch; and the circuit drive control module is configured to, for each of the discharge branches in the two-wire discharge circuit of the battery, perform drive control on the switch transistor for controlling the charge-discharge time period of the bus capacitor in the discharge branch by the readjusted master control PWM signal corresponding to the discharge branch.

10. The device for controlling the two-wire discharge circuit of the battery according to claim 7, wherein the preset feedforward signal is denoted as $1-U_{batt}/U_{dc}^*$, $U_{batt}$ denotes a power supply voltage of a power supply in the two-wire discharge circuit of the battery, and $U_{dc}^*$ denotes a given value of a preset bus voltage.

11. The method for controlling the two-wire discharge circuit of the battery according to claim 2, wherein in a case that for any one of the discharge branches, the initial master control PWM signal corresponding to the discharge branch is obtained by controlling the two-wire discharge circuit of the battery in the dual-loop control manner comprising the full-bus voltage outer loop and the closed loop of the average value of the inductor currents in the two-wire discharge circuit of the battery, the method further comprises: for each of the discharge branches in the two-wire discharge circuit of the battery, comparing the average value of the inductor currents in the two-wire discharge circuit of the battery with an actual value of an inductor current in the discharge branch, to obtain a third current difference signal;

regulating the third current difference signal by a PI regulator to obtain a fourth PWM signal; and adding the fourth PWM signal and the adjusted master control PWM signal corresponding to the discharge branch to obtain a readjusted master control PWM signal corresponding to the discharge branch, and performing drive control on the switch transistor for controlling the charge-discharge time period of the bus capacitor in the discharge branch by the readjusted master control PWM signal corresponding to the discharge branch.

12. The method for controlling the two-wire discharge circuit of the battery according to claim 3, wherein the preset feedforward signal is denoted as $1-U_{batt}/U_{dc}^*$, $U_{batt}$ denotes a power supply voltage of a power supply in the two-wire discharge circuit of the battery, and $U_{dc}^*$ denotes a given value of a preset bus voltage.

13. The device for controlling the two-wire discharge circuit of the battery according to claim 8, wherein the preset feedforward signal is denoted as $1-U_{batt}/U_{dc}^*$, $U_{batt}$ denotes a power supply voltage of a power supply in the two-wire discharge circuit of the battery, and $U_{dc}^*$ denotes a given value of a preset bus voltage.

* * * * *